Figure 1:
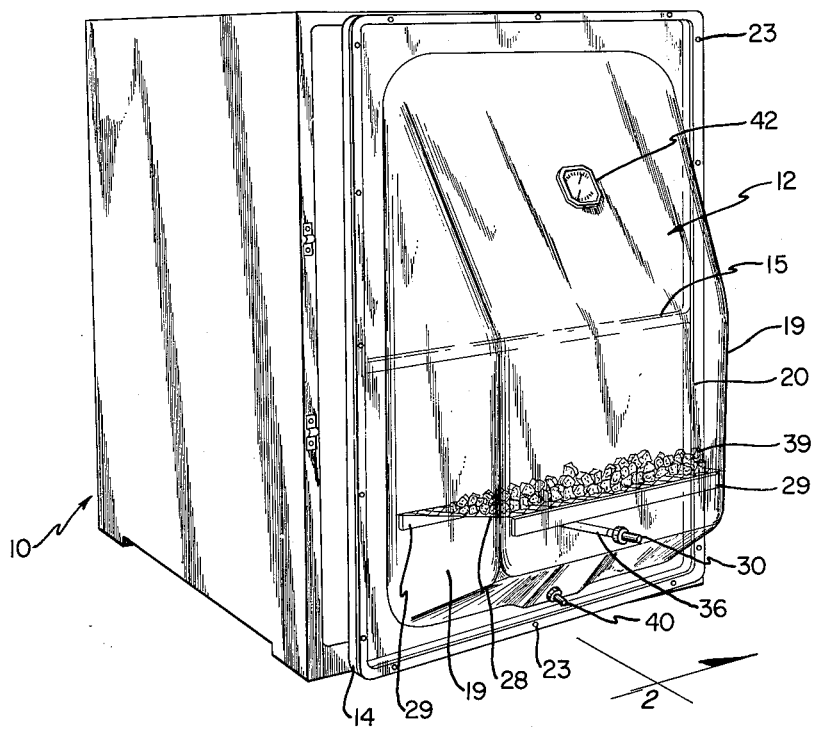

April 18, 1961  C. E. SNYDER  2,980,112

OXYGEN DOOR

Filed Jan. 12, 1959

INVENTOR.
CHARLES E. SNYDER
BY
Philip H. Sheridan
ATTORNEY

United States Patent Office 2,980,112
Patented Apr. 18, 1961

2,980,112

OXYGEN DOOR

Charles E. Snyder, 1823 S. Ivy, Denver, Colo.

Filed Jan. 12, 1959, Ser. No. 786,308

6 Claims. (Cl. 128—191)

This invention relates to the treatment of air for circulation within an enclosure for animals and the like and is more particularly related to a door or panel construction for a kennel for animal patients adaptable to condition the inside of the kennel for controlled recirculation of fresh air being introduced into the kennel.

In the treatment of patients, both human and animal, it is often necessary to isolate the patient in a controlled atmosphere. With respect to animals, for example, the patient may be housed in a kennel and for this reason whenever it is desired to control the quality of the air within the kennel it is advantageous to provide a separate door attachment with the necessary means for treating and regulating the air as a replacement for the standard door. Of course the kennel itself, for this purpose, is hermetically sealed, so that the only source of air from the kennel is by means of the special attachment. In addition, in treating the air, primary considerations are its temperature, humidity and the efficient removal of gases, such as $CO_2$, from the inside air.

In accordance with the present invention it is proposed to treat the air in a way such that the patient is continually receiving a fresh supply of oxygen made up of a selected mixture of fresh oxygen together with the inside air. In this manner the inside air alone may be treated and recirculated with the fresh oxygen in sufficient quantities to modify the fresh air to the desired extent for inhalation by the patient. Most important, recirculation of the inside air is accomplished by controlling the flow characteristics of the fresh air passing through the door attachment so as to induce the proper flow of inside air for treatment and re-entry in selected quantities proportional to the influx of fresh air, and thereby to make the entire operation greatly simplified, efficient and dependable.

Accordingly, it is a primary object of the present invention to provide in an enclosure for patients a way of simply and dependably controlling the quality and quantity of air being circulated therethrough.

It is another object to provide in an enclosure for animal patients an efficient way of circulating a fresh supply of oxygen, together with the treatment of the inside air for recirculation with the fresh oxygen.

It is a further object to provide for a door attachment for an animal enclosure wherein means are provided for inducing the withdrawal of exhaled air for treatment and recirculation by the controlled flow of fresh oxygen into the enclosure.

It is still a further object to provide in a door attachment for a kennel and the like means for admitting outside air into the enclosure in such a way as to create a reduced pressure area for inducing the flow of inside air through a treatment chamber for mixture and recirculation in controlled quantities with the fresh air passing into the enclosure.

Figure 2:
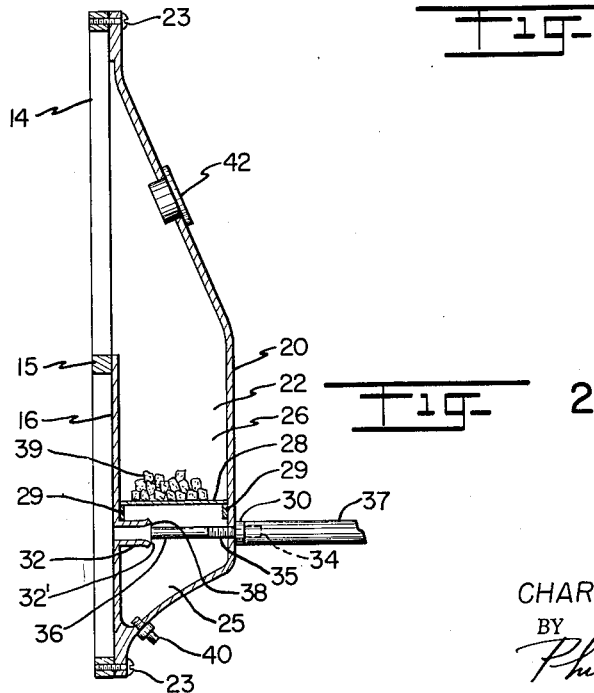

In accordance with the above and other objects of the present invention, a more complete understanding thereof may be gained from the following detailed description taken together with the accompanying drawings in which a preferred embodiment is illustrated and in which:

Figure 1 is a perspective view of a kennel incorporating a door attachment in accordance with the present invention; and Figure 2 is a vertical section view taken on line 2—2 of Figure 1.

Referring more particularly to the drawings, there is shown by way of illustrative example in Figure 1 a hermetically sealed enclosure in the form of a dog kennel 10 provided with a door unit 12, in accordance with the present invention, the latter being specially designed for controlling the quality of the air being circulated through the enclosure. The door unit 12 is broadly comprised of a generally rectangular flange 14 which may be hinged or otherwise suitably connected in sealed relation to the open end of the kennel together with a cross support 15 extending at an intermediate point across the width of the door and which serves as the upper border for a lower, flat panel section 16. Tapering forwardly from adjacent the peripheral flange 14 are curved side portions 19 terminating in a common outer wall 20 so as to form between the panel 16 and wall section 20 a pocket or compartment 22 which is recessed or open at its upper end above the cross support 15 to communicate with the upper air space within the enclosure.

With the exception of the rectangular flange 14 and cross support 15, the door unit 12 as described is preferably formed of a rigid, transparent material such as Plexiglas to afford the entrance of light into the enclosure and to permit the continual observance of the patient. To securely support the panel 16, sides 19 and wall section 20, the flange 14 and cross support 15 may be suitably formed of a metallic material with the outer edges of the sides 19 and panel 16 being fastened to the flange by screws 23 or other suitable means.

In order to simply and efficiently condition and mix the inside or exhaled air with the fresh air source for circulation through the enclosure 10 the air intake section into the enclosure is so designed that the introduction of fresh oxygen therethrough will initiate and regulate the flow of inside air for treatment, then recirculation in selected quantities with the fresh air, and without the use of special circulating means, especially those requiring some outside electrical power source, such as a fan or blower arrangement. Also, it is made possible to control the quality of the air merely by controlling the flow capacity of oxygen through the air intake section. For this purpose the compartment 22 is divided preferably into a lower mixing or intake chamber 25 and upper treatment chamber 26 by an open horizontal support or tray 28 which preferably is constructed of a screen or wire mesh member in order to permit communication between the two chambers. As shown, the tray 28 is located beneath the cross support 15 for disposition on ledges 29 secured to the panel 16 and wall section 20, respectively.

Fresh air or oxygen may be introduced into the enclosure through an air inlet 30 projecting into the mixing chamber 25 in direct communication with an inwardly tapered duct or venturi 32 extending into the enclosure. The air inlet 30 preferably includes a nipple 34 having a threaded connection 35 for fastening to and extending through the wall section 20 with a tube 36 secured to the inner end of the connection 35. A suitable source of oxygen, not shown, may be connected into the air inlet through a hose 37, the oxygen source having suitable valve means to control the capacity and pressure of oxygen flowing through the air inlet. In addition the tube 36 extends across the mixing chamber to a point adjacent to the flared mouth 32' of the venturi 32. As will be noted, the tube 36 and venturi 32 are aligned in coaxial relation and with the flared mouth 32' being slightly enlarged with respect to the end of the tube so as to form an annular space 38 between the respective ends.

In its preferred form, the treatment chamber 26 is specifically constructed to cool and humidify the inside air while at the same time removing $CO_2$ therefrom, although it will be understood that the chamber 26 may be provided with other suitable means to condition the air in the desired manner. In any event, the wire mesh member 28 serves to support a coolant such as ice cubes 39 thereon so that the exhaled air in passing downwardly through the ice will be simultaneously cooled, humidified and cleared of any $CO_2$ which will condense into liquid form and drip down to the bottom of the mixing chamber. For this reason it is desirable to provide a liquid outlet 40 so that the liquid which accumulates in the bottom of the chamber may be periodically drained off. In addition, an indicator 42 is shown mounted in the upper side portion 19 to take humidity and temperature readings of the inside air as it flows into the treatment chamber from the upper air space in the enclosure.

As oxygen is introduced through the air inlet, when it flows through the venturi 32 the pressure will of course be decreased due to the corresponding increase in velocity. This in turn will create a reduced pressure area in the annular space 38 surrounding the tube 36 so as to initiate the downward movement of air from the treatment chamber and consequently from the upper air space as well. Depending upon the pressure differential established in the venturi, it will be evident that the amount of inside air drawn through the venturi will correspondingly vary so that the ratio of inside air to fresh air flowing into the enclosure may be established for any given initial pressure of the oxygen. Of course, the initial oxygen pressure may also be varied for flow through a given venturi size to vary the amount of treated inside air drawn therethrough. In this connection, the air being exhaled by the patient will naturally rise into the upper air space and with the aid of the smooth contour of the compartment a minimum reduction in pressure is required to induce the downward flow of air over the coolant tray.

It will thus be apparent from the foregoing description that the present invention provides a unique combination of features in establishing the controlled circulation of air within a hermetically sealed enclosure without utilization of any moving parts, and in a way such that the temperature and humidity conditions of the air may be varied simply by controlling the flow of oxygen or similar gas into the enclosure. At the same time undesirable gases are cleared from the inside air prior to recirculation of the air, and may be quickly and easily removed from the compartment without interrupting the operation. Moreover, it will be evident that the principles of the present invention are conformable for use in other applications than the treatment of the sick; for example, simulated or actual high altitude operations and in general wherever it is desired to deliver air to a person or animal within a sealed enclosure.

Accordingly, it is to be understood that various other modifications and changes may be made in the combination and construction of parts forming the present invention without departing from the scope thereof as defined by the appended claims.

What is claimed is:

1. An oxygen door for a hermetically sealed enclosure for animals and the like comprising a panel, an outwardly disposed wall section defining with said panel a compartment, an open support dividing said compartment into upper and lower chambers, said upper chamber communicating with the upper air space in said enclosure and including coolant means disposed on said support for condensation of $CO_2$ from the exhaled air with said open support being so constructed as to allow the condensed $CO_2$ to collect in said lower chamber, an air inlet line extending through said compartment for introduction of an exterior source of oxygen into said enclosure including a spaced coaxial pressure reduction tube in said compartment for reducing the pressure in said lower chamber to an extent sufficient to induce the downward flow of exhaled air through said compartment, and a liquid outlet for withdrawal of condensed vapor from said lower chamber.

2. A transparent oxygen door for a hermetically sealed enclosure for animals and the like comprising a panel, an outwardly disposed wall section defining with said panel a compartment, a screen dividing said compartment into upper and lower chambers, said upper chamber communicating with the upper air space in said enclosure and including coolant means disposed on said screen for condensation of $CO_2$ from the exhaled air, an air inlet line extending through said compartment for introduction of an exterior source of oxygen into said enclosure including a spaced coaxial venturi passage in said compartment for reducing the pressure in said lower chamber to an extent sufficient to induce the downward flow of exhaled air through said compartment for mixing and recirculation with the oxygen, and a liquid outlet for withdrawal of condensed vapor from said lower chamber.

3. An oxygen door for a hermetically sealed enclosure comprising an outer wall section and an inner spaced panel forming with said wall section a compartment communicating with the interior of the enclosure, an air inlet line extending through said compartment for introduction of an exterior source of oxygen into the enclosure including pressure reduction means within said compartment for reducing the pressure in said compartment an extent sufficient to induce the flow of exhaled air from the enclosure into said compartment for recirculation with the exterior source of oxygen, and treating means disposed within said compartment to treat the exhaled air flowing from the enclosure prior to recirculation with the oxygen.

4. An oxygen door according to claim 3 in which said air inlet line is extended generally horizontally through the lower end of said compartment.

5. An oxygen door according to claim 3 in which said wall section is curved forwardly from said panel to form said compartment, said panel being relatively flat and terminating in spaced relation beneath said wall section to form an upper space for communication between said compartment and the enclosure.

6. An oxygen door for a hermetically sealed enclosure comprising an outer wall section and an inner spaced panel forming with said wall section a compartment communicating with the interior of the enclosure, an air inlet line extending through said compartment for introduction of an exterior source of oxygen into the enclosure including a spaced coaxial pressure reduction tube within said compartment for reducing the pressure in said compartment an extent sufficient to induce the flow of exhaled air from the enclosure into said compartment for recirculation with the exterior source of oxygen, and coolant means disposed within said compartment to treat the exhaled air flowing from the enclosure prior to recirculation with the oxygen.

References Cited in the file of this patent
FOREIGN PATENTS 1,119,309     France _____ Apr. 3, 1956